Feb. 1, 1938.  G. C. SOUTHWORTH  2,106,768
FILTER SYSTEM FOR HIGH FREQUENCY ELECTRIC WAVES
Filed Sept. 25, 1934  3 Sheets-Sheet 1

INVENTOR
G. C. Southworth
BY
ATTORNEY

Feb. 1, 1938.   G. C. SOUTHWORTH   2,106,768
FILTER SYSTEM FOR HIGH FREQUENCY ELECTRIC WAVES
Filed Sept. 25, 1934   3 Sheets-Sheet 3

INVENTOR
G. C. Southworth
BY
ATTORNEY

Patented Feb. 1, 1938

2,106,768

UNITED STATES PATENT OFFICE

2,106,768

FILTER SYSTEM FOR HIGH FREQUENCY ELECTRIC WAVES

George C. Southworth, Ridgewood, N. J., assignor to American Telephone and Telegraph Company, a corporation of New York Application September 25, 1934, Serial No. 745,457

33 Claims. (Cl. 178—44)

An object of my invention is to provide a new and improved system for separating high frequency electric waves in different channels according to their frequencies. Another object is to separate electric waves in dielectric guides to physically distinct channels in accordance with different desired frequency ranges. Still another object is to provide means for applying to dielectric guide systems the technique that is applicable to conventional frequency selective networks. All these objects and other objects and advantages of my invention will become apparent on consideration of a limited number of examples of practice according to the invention which I have chosen to be presented in the following specification and the accompanying drawings. It will be understood that this disclosure has reference principally to these particular embodiments of the invention and that its scope will be indicated in the appended claims.

This application is in respect to a part of its subject-matter, a continuation of my patent application, Serial No. 661,154, filed March 16, 1933, relating to a system for the transmission of electric waves along a dielectric guide. Reference is made also to my pending application Serial No. 701,711, filed December 9, 1933, which is directed generally to the transmission of electromagnetic waves through metallic pipe guides, and to my allowed applications Serial No. 37,557, filed August 23, 1935, and Serial No. 73,940, filed April 11, 1936.

Referring to the drawings, Figs. 5 and 6 are curve diagrams showing attenuation as a function of frequency for certain dielectric guides. Fig. 7 is a diagrammatic longitudinal section of apparatus adapted for experimental verification of such relations as represented in the curve diagrams of Figs. 5 and 6. Fig. 7a is a longitudinal section of modified apparatus having the same use as that of Fig. 7. Fig. 7b is an elevation of the element 20 of Fig. 7a. Fig. 7c is an elevation of a stencil or template which may be used in making the element shown in Fig. 7b. Fig. 33 is a sectional diagram of an impedance matching connection for parts of a dielectric guide of different diameters. Fig. 34 is a curve diagram for the standing waves set up in this connection.

In my application for Letters Patent, supra, I disclose novel systems for the guided transmission of electromagnetic waves. It is there shown that rods of solid dielectric material, hollow metallic pipes and other structures comprising a dielectric medium of restricted cross-section having a boundary which separates it from a medium of substantially different electromagnetic constants, are capable of sustaining certain kinds of electromagnetic waves of very high frequency. A wave guide of this general character I refer to as a "dielectric guide".

Several different kinds of electromagnetic waves that may be "dielectrically guided" within a dielectric guide are also disclosed in my application supra. In each of them there is a substantial field component, electric or magnetic or both, in the direction of wave propagation. The go-and-return flow of conduction current characteristic of ordinary transmission systems is not essential in these waves. Again, in the systems disclosed there is a cut-off frequency, correlated with a transverse dimension (the internal diameter, e. g.) of the guide and the index of refraction of the dielectric medium, which separates a frequency range of comparatively easy transmission and a lower frequency range of zero or negligible transmission. The velocity of propagation is in general different than that characteristic of light in the dielectric medium, and it is a function of a transverse dimension of the guiding structure. These and other characteristics which have been observed and described serve to identify dielectrically guided waves and to distinguish them from waves and manners of wave propagation known heretofore.

Figure 1:
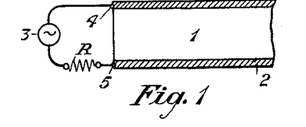
Figure 1 is a diagrammatic view showing a dielectric guide in longitudinal section.

Various types of high frequency electric waves, that is, dielectrically guided waves of different characteristic field patterns, may be transmitted along dielectric guides. For example, if a dielectric guide 1 comprises an enclosing metallic shell 2 as shown in Fig. 1, and if an alternating electromotive force of sufficiently high frequency is applied from the source 3 across two diametrically opposite points 4 and 5 at the end of the shell 2, then electromagnetic waves will be generated in the dielectric 1 and propagated along it away from the end associated with the source 3. The dielectric core within the shell 2 may be empty space, or more conveniently, air, which for the purpose considered has dielectric properties substantially the same as empty space. According to the nature of the connection from the source 3 to the end of the guide 1—2, the waves in the guide may be of different types such as symmetric electric, symmetric magnetic, asymmetric electric and asymmetric magnetic. For these four types of waves I employ the respective symbols $E_0$, $H_0$, $E_1$ and $H_1$. These four types are mentioned by way of example, as there may be other types. The simple connection shown in Fig. 1 is adapted for the generation and propagation of asymmetric magnetic waves ($H_1$) which have transverse lines of electric force somewhat as indicated in the cross-section shown in Fig. 2. These four types of waves are distinguished as symmetric or asymmetric in relation to an axis lying in the direction of propagation, and they are electric or magnetic according as they have a principal component of electric or magnetic force in that direction.

The limiting frequency of propagation in a metal sheathed dielectric guide is given by the formula $$f = Nc/2\pi b\sqrt{k}$$

where N is a coefficient depending on the type of wave, being 2.4 for $E_0$ waves, 3.83 for $H_0$ and $E_1$ waves, and 1.83 for $H_1$ waves; c is the velocity of light in empty space; $\pi$ is the well-known ratio of a circle circumference to its diameter; b is the radius of the guide; and k is the dielectric constant of the guide material. If the guide is metal sheathed, with an air core, then $k=1$ and the foregoing formula becomes $f=Nc/2\pi b$. The foregoing relations may be expressed otherwise thus: Cut off occurs at the wave length $\lambda$ when $N\lambda$ equals the circumference of the guide. This statement holds true for any medium as dielectric, whether air or other, understanding that the wave length is for free waves characteristic of that medium. The foregoing formula in which k appears is for a metal sheathed dielectric guide. For an all-dielectric guide, the corresponding formula is $$f = Nc/2\pi b\sqrt{n^2-1}$$

where n is the index of refraction, or $n^2=k$. Accordingly, the two formulas are negligibly different when n is large, say when n is about 10 units. Phase velocities may be greater or less than the velocity of light in free space depending on the character of the dielectric medium.

By virtue of the properties of dielectric guides that have been mentioned, they may be utilized in either or both of two ways for electric wave filters. First, reflection effects may be set up within a guide, so that it will appear to the power source as a reactance, which may be made to vary in magnitude all the way from negative infinity to positive infinity by varying the frequency over a certain range. Second, any guide is inherently a high-pass filter by virtue of its cut-off at or about the frequency determined by one of the foregoing formulas with the appropriate coefficient N.

The first of these two ways of utilizing the properties of a dielectric guide for filter purposes, will now be considered. The principles involved are applicable generally with any one of the four types of waves that have been mentioned. For the sake of definiteness and clearness, the following description will have reference especially to a particular example of these types, which may be taken conveniently as asymmetric magnetic ($H_1$). It will be assumed that the dielectric core of the guide is a cylinder of air surrounded by a metallic sheath, with the understanding that other dielectrics than air, having higher dielectric coefficients, may permit a reduction in size of the guide, and that if the coefficient is rather high, the metallic sheath may be removed.

Figure 2:
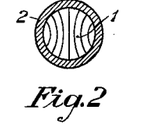
Fig. 2 is a cross-section of the same.
Figure 3:
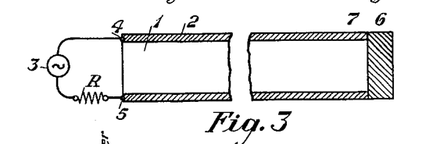
Fig. 3 is a longitudinal section of a dielectric guide with a terminal plate at the end distant from the power input end.

Let the guide shown in Figs. 1 and 2 be more definitely specified as having an end plate 6 across its end 7 distant from the source 3, as shown in Fig. 3. We shall consider the mode of operation when this end plate is, first, a perfect conductor and therefore, a perfect reflector of electromagnetic waves, second, when the plate 6 is removed and the end 7 of the guide is open, and, third, when the plate 6 is an imperfect conductor, with its conductance adjusted so that the incident waves are completely absorbed. It will readily be understood that there may be other cases intermediate to these three cases.

Assuming that the terminating plate 6 is a perfect reflector there will be total reflection of the electric waves in the guide 1, without loss of energy; this will involve an instantaneous reversal of phase of the electric component at the surface of the plate 6. Let the frequency $f$ of the generator 3 be adjusted so that for the given length $l$ of the guide the reflected wave returns to the initial end 4—5 in opposite phase to the impressed wave at that end. The resultant electric force at 4—5 will be zero, the reactance across the terminals 4, 5 will be infinite, and the load will appear to the generator 3 as an open circuit. In this case the length $l$ will be an odd multiple of a quarter wave length in the guide, that is, $l=(2n+1)\lambda/4$. Let the frequency at this adjustment be $f\infty$.

With the dimensions unchanged let the frequency be increased gradually from the value $f\infty$. The returning wave will no longer be in phase opposition to the impressed wave at the input end and the total wave intensity at this point will be built up to a limit dependent mainly on the resistance R in the circuit of the generator 3. At the maximum of wave intensity, the length $l$ of the guide will be an integral multiple of a half wave length in the guide, that is, $l=n\lambda/2$. Whereas in the first case the reactance to the generator 3 was infinite at frequency $f\infty$, now when the frequency is increased from that value, the reactance will take a finite negative value and will approach zero, and at the value $f_0$ of the frequency for maximum wave intensity, this reactance will be zero. With further increase of frequency the reactance will become positive and will increase to infinity whereupon the change of wave length again makes the length $l$ equal to an odd multiple of a quarter wave length. With increase of frequency over a wide range the reactance presented to the generator 3 will go repeatedly through a cycle of changes such as has just been described, as represented in the reactance-frequency diagram of Fig. 4.

The foregoing discussion has been based on having the end plate 6 in Fig. 3 a perfect conductor. Now let this end plate be removed and the end of the guide left open. Reflection occurs as before, except that now it is with a time delay of one-half period, and with respect to energy transmission this reflection will be only partial. Standing waves may be produced in a guide of this kind, but by virtue of the time delay of a half period the frequency for least reactance effect at the generator will be such that it makes the guide length $l$ more like an odd multiple of a quarter wave length than of an integral multiple of a half wave length, as was the case for the perfectly reflecting metallic plate 6. The lines of electric force may be strictly transverse within a guide, but at an open end, as in this case, they will bow out a little; hence, this relation of guide length and half wave length may not hold exactly. In other words, the actual length of the guide will be slightly less than its virtual length, and the virtual length must be taken in the formula $l=(2n+1)\lambda/4$.

Figure 4:
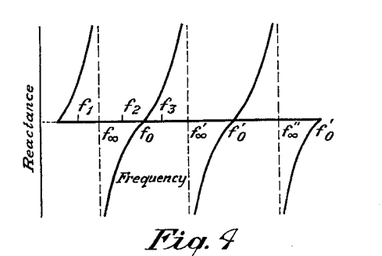
Fig. 4 is a curve diagram showing reactance as a function of frequency for certain dielectric guides.

In this case of the open end guide there will be considerable radiation from the open end with corresponding transmission of energy so that the impedance to the generator 3 at the sending end must be considered to have an equivalent resistance component. Accordingly, the total impedance on the generator 3 has two components which must be added vectorially at a right angle, one a reactance and the other an equivalent resistance. It follows that the extreme effects corresponding to frequencies $f\infty$ and $f_0$ will not be as noticeable in the case of the open end guide as in the case of the guide terminated by a perfect conductor plate 6. To a degree of approximation, the reactance-frequency diagram for an open end guide will be as shown in Fig. 4 for the perfect reflector guide except for an appropriate shift along the axis of abscissas, so that the $f_0$ values will come at frequencies corresponding to odd multiples of a quarter wave length instead of integral multiples of a half wave length.

Now consider the case in which the plate 6 of Fig. 3 is a medium of partially perfect conductivity adjusted at such value, whatever that may be, that the energy of the incident waves is completely absorbed. There will be no reflection and therefore no standing waves. At frequencies not too low, that is, not too near the frequency at which the waves become too long to be transmitted in a guide having the dimensions of the guide considered, the load on the generator will be virtually a pure resistance.

It is possible to vary conditions in the open end guide of the case previously considered so as to approach the conditions for the critical non-reflecting termination of the last case considered. This may be done by enhancing radiation as by expanding the open end of the guide into a horn-like termination such as shown at the right of Fig. 7.

It will be recalled that two ways were mentioned in which dielectric guide properties could be utilized for filters, namely, first, by reflection and reactance effects, and, second, by the inherent high-pass property of a dielectric guide. The immediately foregoing discussion has had relation to the first of these; we now consider the second.

However a guide such as that of Fig. 1 be terminated, if the frequency is too low it will not transmit; hence any dielectric guide is a high-pass filter with a single critical or cut-off frequency. This is a matter of variation of attenuation rather than variation of reactance, as a function of frequency. Logarithmic attenuation-frequency diagrams are given in Fig. 5 for the different types of waves. All these diagrams are for a metallic-shell air-core guide of 12.7 cm. inside diameter. The steepness of the curves at the left corresponds to sharpness of cut-off with decreasing frequency. Otherwise to make this evident, the same relation for asymmetric magnetic waves is plotted again in Fig. 6, but this time the diagram is semi-logarithmic, the attenuation is in decibels per meter instead of per mile, and the characteristics are shown for three different guide diameters. Though the scale chosen is one customary for depicting characteristics of this kind, the cut-off is so sharp in each case that each curve is virtually sharply L-shaped, as shown.

Figures 5, 6, 7, 7A, 7B, 7C:
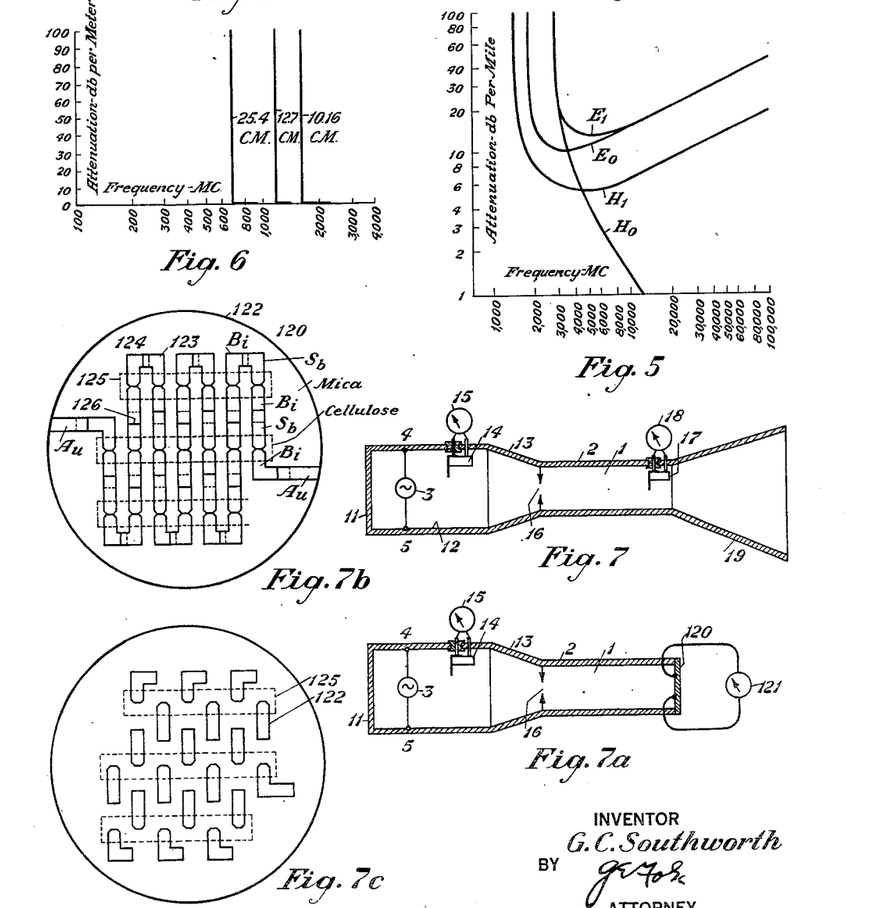

Though the characteristics of Figs. 5 and 6 may be obtained by mathematical computation, they may be verified experimentally by means of apparatus such as shown in Fig. 7. Here a length of guide with air core 1 and shell 2 is represented in longitudinal section. At the sending end is an enlarged chamber with cylindrical wall 12 and end wall 11, the generator 3 being connected at points 4 and 5, a quarter wave length along the axis from the end wall 11. The chamber 12 is connected with the input end of the guide 1—2 by a tapering wall 13. The detector 14 and meter 15 measure the wave power as applied at the input end of the guide 1—2. Across this input end is an adjustable iris 16 by which the power entering the guide may be adjusted. At the output end is another detector 17 and associated meter 18 for measuring the power at the output end of the guide. This output end is terminated by a flaring horn 19 to enhance radiation and minimize reflection back into the guide 1—2. When properly terminated there should, of course, be no standing waves. The readings on the meters 15 and 18, together with the frequency measurements of the source 3, provide the data for plotting such curves as in Figs. 5 and 6, or verifying such curves, in such cases as they may have been computed mathematically.

Fig. 7a shows a modification of the above method of measuring transmission through a filter. The component parts are much the same as shown in Fig. 7 except that the detector 17 and meter 18 as well as the horn 19 of that figure are replaced by a specially constructed pad 120 made up of thermocouples in series; this is shown in detail in Fig. 7b. This pad is placed across the end of the filter element 1—2 under test and is so arranged as to provide a substantially non-reflecting termination for the incident radiation and also a measure of the wave power incident upon it. The latter is determined by measuring the electromotive force generated by the thermo elements by means of the voltmeter 121 connected to the two ends of the series of thermocouples.

The construction of the absorbing pad is shown by Fig. 7b. A sheet of mica 122 perhaps 1 millimeter thick and having a diameter approximately that of the filter element under test has deposited upon it a continuous strip of metallic film 123, about one-half centimeter wide, made up of alternate sections of two materials having different thermoelectric powers. The materials bismuth (Bi) and antimony (Sb) are satisfactory for this purpose. These films may be deposited through a suitably cut template, shown by Fig. 7c, either by the process known as sputtering or by that known as evaporation. After one material, say Bi, has been deposited the template is rotated one half turn and the second material, Sb in this case, is added.

Each alternate junction is constructed with a slight overlap and with a restricted cross section, as at 124. This junction is furthermore formed over a layer 125 of material of low heat conductivity, such as cellulose, previously mounted on the mica in transverse strips as shown in Figs. 7b and 7c. All of these features tend to elevate the temperatures at these junctions 124 when subjected to radiation. They are therefore referred to as hot junctions to distinguish them from the cold junctions, for which precautions are taken that tend to make the corresponding temperatures low. At the cold junctions 126 there is considerable overlap of the antimony on the bismuth.

Radiation such as propagated through a wave guide or through the filter element 1—2 of Fig. 7a impinges on the metal film and is absorbed or reflected more or less according to the density of the film and the closeness of the conducting strips which make up the grid. By a suitable choice of these factors as determined either by experiment or calculation, the condition of critical absorption (non-reflecting termination) may be approximated.

The heat developed in the process of absorption gives rise to higher temperatures at the hot junctions 124 than at the cold junctions 126, as already explained, thereby leading to a continuous series of electromotive forces throughout the metal strip. This phenomenon is commonly known as the Seebeck effect, a fundamental thermionic phenomenon.

The electromotive force as measured by a potentiometer or a sensitive voltmeter 121 will be proportional to the temperature differences developed at the two kinds of junctions 124 and 126 and therefore approximately proportional to the product of the respective electric and magnetic fields of the incident radiation.

Turning attention again to the first class of filters, namely, those depending on the reflection and reactance effects, several different embodiments of such filters will now be disclosed.

Figures 8, 9, 10, 11, 12, 13:
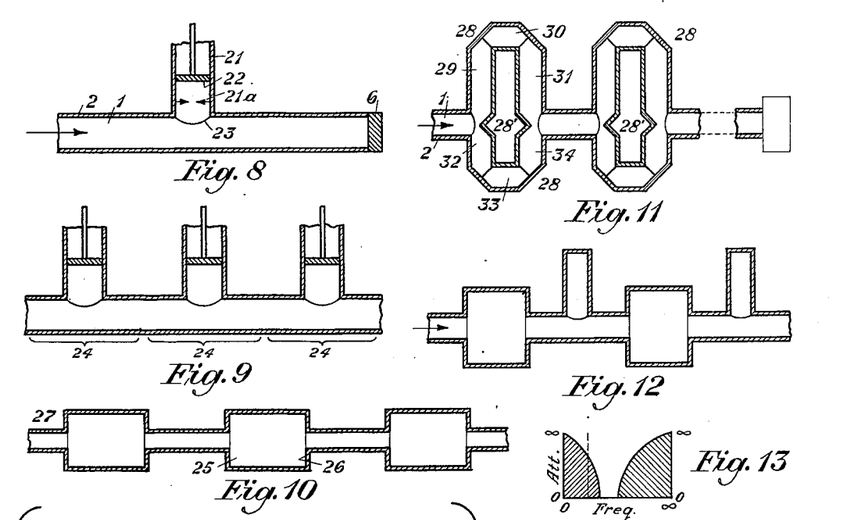
Fig. 8 is a diagrammatic longitudinal section of a dielectric guide filter having a stub branch.
Fig. 9 is a similar diagram showing a plurality of such stub branches in sequence.
Fig. 10 is a longitudinal sectional diagram of a dielectric guide filter having enlargements in sequence.
Fig. 11 is a diagram of a dielectric guide filter having opposite return branches in pairs of unequal length.
Fig. 12 is a diagram showing the elements of Figs. 9 and 10 in alternation.
Fig. 13 is a curve diagram showing attenuation as a function of frequency for the filter of Fig. 12.

Fig. 8 represents a dielectric guide 1—2 in which transmission is from left to right. On the right, this guide is terminated by a completely absorbing plate 6. At an intermediate place along its course there is a branch guide 21 which is terminated by an adjustable reflecting plunger 22. If the diameter of the main guide 1—2 is small, and the wave length is relatively long or the guide is terminated at the right in an absorbing element 6 so that there are no standing waves in it, then the attenuation-frequency characteristic of the main guide will be determined mainly by the characteristics of the side tube 21. When the plunger 22 in the side tube 21 reflects perfectly and is adjusted to make the return wave at the mouth 23 of opposite phase to the impressed wave at this point, the impedance looking into the branch 21 will be high, and the mouth 23 will be equivalent to a barrier, as if it were closed across by the side wall of the guide 1—2. In this case the attenuation from left to right in the main guide will be least, and will be the attenuation of the main guide only. When the frequency is such that the reflected waves at the mouth 23 of the side guide 21 are in phase with the entering waves, the side tube will have low impedance and there will be corresponding attenuation along the main guide. If the diagram of Fig. 4 represents the branch guide, and if the frequency varies from $f_1$ to $f_2$, as indicated on the scale of abscissas of Fig. 4, then the reactance in the branch guide will be greater between $f_1$ and $f_2$ than at either of those values and the attenuation in the main guide will be correspondingly less at the intermediate frequency; thus the system as a whole from left to right will operate as a band-pass filter. If the operation is at frequencies from $f_2$ to $f_3$, the attenuation along the main guide will be greater between $f_2$ and $f_3$ than at either extreme, and the system will function as a band attenuation filter.

If the element 6 at the right of Fig. 8 is taken as representing an electromagnetic wave receiver, then it operates on the output side of a filter by which it receives only the waves in a certain range or ranges, as indicated above.

Whatever the degree of selective action of the system of Fig. 8 may be, it is decidedly enhanced by arranging identical sections 24 in sequence as shown in Fig. 9, each section like Fig. 8, and the sections being equally spaced.

Instead of a sequence of shunt elements as in Fig. 9, we may have a sequence of series elements as in Fig. 10. Within each enlargement or chamber 25 there will be partial reflection at its remoter wall 26, in relation to the corresponding input from the left, and this will establish a series reactance at the input 27 which will be low or high according to the length of the chambers 25, compared to a wave length. Thus, as the frequency is varied over a wide enough range, the reactance will vary as in Fig. 4. High reactance will correspond to high attenuation and low reactance to low attenuation, so that in a range which comprises one and only one of these extremes, the system will operate respectively as a band attenuation filter or a band-pass filter.

Let the reflecting elbows 28 and 28' and the branching units 29, etc., of the system of Fig. 11 be constructed so as to present no discontinuities to waves propagated from left to right. The branches 29—30—31 and 32—33—34 may be made of different effective wave lengths as by making them of different diameters or different lengths. In Fig. 11 they are shown of different lengths. As the input frequency is varied, there will be a frequency at which the difference of length of the two paths 29—30—31 and 32—33—34 will be a half wave length, whereupon the recombined wave at the point of junction of branches 31 and 34 will be nil and the system will present high impedance at the input. As the frequency is varied either way from this critical value it will eventually become such that the path difference will be zero or a full wave length, whereupon there will be full value of the intensity at the junction of the two branches 31 and 34; at this stage the over-all attenuation will be low. By repeating the structure in sequence as shown in Fig. 11, the effect described above will be enhanced and the system will serve as a band attenuation filter for the range of frequencies considered.

When we are interested in rather wide bands any one of the three devices of Figs. 9, 10 and 11 may be used to function as a band-pass filter at one adjustment of wave length range in relation to physical dimensions, or as a band attenuation filter at another such adjustment. If we are interested in a narrow band within a narrow range of frequencies, any one of these devices may function as a high-pass or low-pass filter operating at one end of the band contemplated in connection with the foregoing mention of a wide band.

The units of Figs. 9 and 10 may be employed in sequence in alternation as shown in Fig. 12. Each unit operates as described for Figs. 9 and 10 and the combination of Fig. 12 gives enhanced selective effect.

In the filters described in connection with Figs. 8 to 12, it will be seen that a dielectric guide is provided with regularly disposed partial discontinuities which set up standing waves selectively in accordance with the spacing of those discontinuities in relation to wave lengths.

Figures 14, 15, 16, 17, 18, 19:
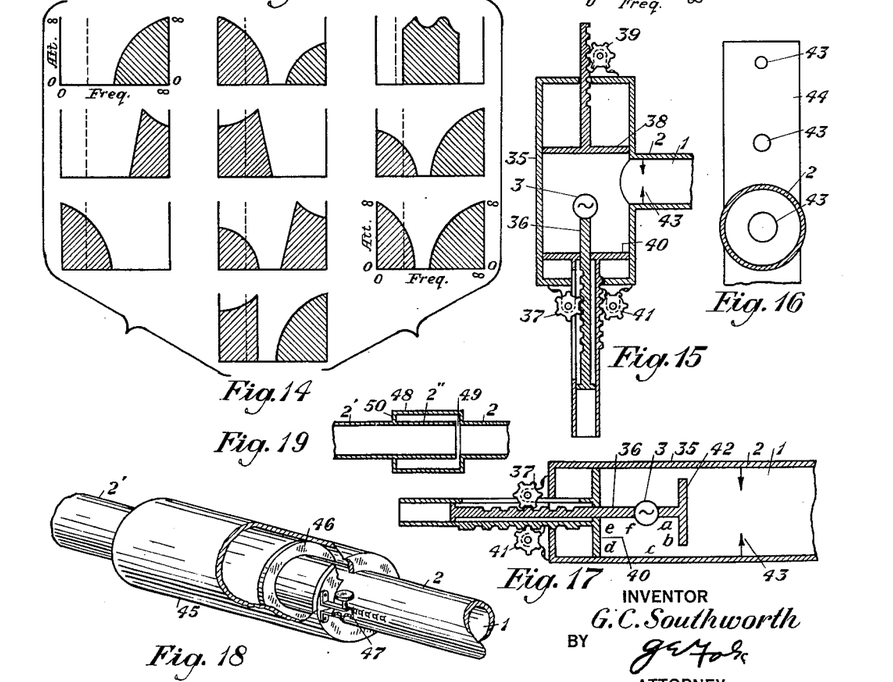
Fig. 14 is a set of similar curve diagrams which may be realized by various combinations of the elements shown in the foregoing figures.
Fig. 15 is a section showing a dielectric guide and a power source adjustably connected for impedance match.
Fig. 16 is a detail of an adjustable iris for the combination of Fig. 15.
Fig. 17 is a section of apparatus for a different type of wave, but having the same object as that of Fig. 15.
Fig. 18 is a perspective view partly in section showing an enlargement like the enlargements of Fig. 10, but with facility for adjustment.
Fig. 19 is a section showing a dielectric guide with an external annular reflecting by-pass adapted to operate on the concentric conductor principle.

Fig. 13 is an attenuation-frequency diagram which may be approached as an ideal in the performance of any one of the filters of Figs. 9, 10, 11 and 12 when adjusted for band-pass operation. Fig. 14 shows other attenuation-frequency diagrams which may be demonstrated by other adjustments and combinations of the elements shown in Figs. 8 to 12.

An adjustable impedance matching device is shown in Fig. 15 adapted for matching impedances between the source 3 and the dielectric guide 1—2. The output connections for the source 3 are as shown in Fig. 7 at 4 and 5, except that they must be adapted for longitudinal adjustment. The chamber 35 is of conductive material and the source 3 is mounted on an axial rod 36, which is adjustable along the axis of the chamber 35 by means of the pinion 37 engaging the corresponding rack. The opposite end wall 38 is adjustable by another pinion 39 engaging its rack, and the end wall 40 behind the source 3 is similarly adjustable by the pinion 41 engaging its rack. It will be seen that both end walls 38 and 40 and the source 3 are adjustable longitudinally in relation to the opening from the chamber 35 into the guide 1—2. Across this opening is an adjustable iris 43. This may be constructed like a camera shutter, or a slide 44 may be provided as in Fig. 16 with different sized openings 43 along its length.

For any given frequency a resonant adjustment may be obtained by shifting the end walls 38 and 40 and this determines the character of the reactance of the load presented to the source 3. On the other hand, the magnitude of the energy dissipation component will be determined by the size of the opening of the iris 43.

A modification is shown in Fig. 17 which is adapted to generate and propagate the symmetric type of waves. The end wall 40 is adjustable by the pinion 41 engaging the corresponding rack. The plunger rod 36 carries the source 3 and the plunger 42, both adjustable by the pinion 37 engaging the corresponding rack. The resonant chamber between the wall 40 and plunger 42 is adjusted in suitable relation to the frequency of the source 3. The output circuit of the source 3 is indicated, $a\ b\ c\ d\ e\ f$. The energy in the form of symmetric type waves escapes through the annular opening between the edge of the plunger or head 42 and the side wall 35. The quantity of energy going into the guide 1—2 is adjusted by means of the iris 43.

Fig. 18 shows a filter element like each element of Fig. 10, but with facility for adjustment. The guide 1—2 on the right ends in a flange 46 within the enlarged cylinder 45 carried by the aligning guide shell 2' on the left. Facility for adjustment is afforded by the pinion 47 engaging the corresponding rack. When the guide shell 2 is made 4 inches in diameter and the chamber 45 is made 6 inches in diameter and adjusted to 9 inches in length, the device operates as a band-pass filter between the critical frequencies of 1,728 megacycles and 2,000 megacycles. The lower limit is determined by the diameter of the shell 2 and the upper limit is determined principally by the effective length of the chamber 45.

A modification is shown in Fig. 19, particularly adapted for symmetric electric waves. Both the shell 2—2' and the enlarged surrounding chamber shell 48 are of sheet brass. The part of the shell 2' on the left projects into the chamber 48 through the annular end wall 50 leaving a narrow gap 49 at the other end. The part of the guide shell designated 2'' and the chamber wall 48 serve as a coaxial conductor system for symmetric electric waves. Within the guide 2'—2''—2 the waves travel with their lines of electric force attached only to the inner walls of the guide. In this outer chamber 2''—48 the waves travel with their lines of force attached to the inner and outer walls as in ordinary coaxial conductor transmission. Here the velocity is essentially that of light in free space, whereas within the shell 2'—2''—2 the velocity is determined by its diameter. Making the guide shell 2 of diameter 12.5 centimeters and making the chamber 48 of diameter 15 centimeters and 11.25 centimeters long, the device operates as a band-pass filter between 1,832 megacycles and 2,000 megacycles. The lower limit is determined by the diameter of the shell 2 and the upper limit is determined principally by the length of the chamber 48.

Figures 20, 21, 22, 23, 24, 25, 26, 27, 28, 30, 31:
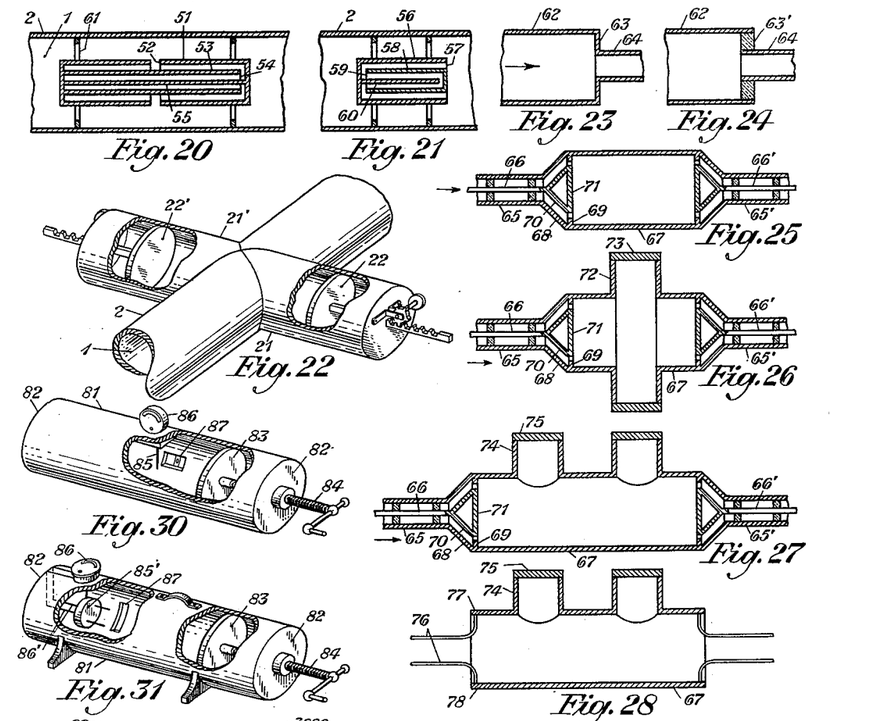
Figs. 20 and 21 are sections of apparatus similar in principle to Fig. 19 but with the concentric conductor reflecting by-pass placed internally instead of externally.
Fig. 22 is a perspective diagram partly in section showing a dielectric guide with opposite adjustable stub branches.
Fig. 23 is a sectional diagram of a dielectric guide having two parts of different diameters to serve as a high-pass filter.
Fig. 24 is like Fig. 23 with the addition of an energy-absorbing annular collar at the junction of the two parts of the guide.
Fig. 25 is a section showing a short length of dielectric guide interposed in a concentric conductor system and effective as a high-pass filter.
Fig. 26 is a longitudinal section like Fig. 25 but with an annular enlargement in the dielectric guide by which it is adapted to operate as a band-pass filter.
Fig. 27 is like Fig. 25 but with a plurality of stub branches to give the same effect as the annular enlargement of Fig. 26.
Fig. 28 is a section showing a dielectric guide filter such as that of Fig. 27 interposed across an ordinary pair of parallel conductors.
Figs. 30 and 31 are perspective views partly in section of respective dielectric guide wave meters.

The guide 1—2 shown in Fig. 20 has an axially disposed resonant member consisting of a series of coaxial conductors placed one within another and supported within the guide by means of specially constructed low loss insulators 61. By properly proportioning the diameter of the shell 51 relatively to the diameter of the metal sheath 2, the characteristic impedance of the coaxial conductor consisting of these two members can be made to match that of the main guide; accordingly, the system offers no impedance irregularity to passing waves in the guide 2 at the appropriate frequency. At other frequencies there will be a discontinuity. Standing waves may be set up in the space between the members 51 and 2. As shown in Fig. 20 there is a gap at 52 in the shell 51 and there is an inner coaxial conductor whose members are 53 and 51; then there is another gap at 54, and a further inner coaxial conductor whose members are 55 and 53. The radial spacing of the different elements is such that these inner coaxial conductors have the effect of added elements relatively to the coaxial conductors whose members are 51 and 2.

A modification is shown in Fig. 21. Here the coupling is effected only at the ends of the elements, which are designated progressively, from the outside to the inside, as 56, 58 and 60, with end gaps 57 and 59. The respective radii are related to make all the coaxial conductors electrically similar.

Referring to Fig. 8, when it is desired to vary the coupling into the side tube 21, an iris diaphragm 21a may be employed. In constructing elements of this kind it is somewhat difficult to establish a definite datum point from which to measure the length of the side tube. Experience has shown that this length may depend somewhat on the positions of any standing waves that may be present in the main guide. Even when the main guide is so terminated that no standing waves are present, the exact place where reflection into the side tube takes place is rather uncertain. Accordingly, final adjustment will in most cases need to be made experimentally. As an example of the relations which may be involved, in one case the main guide 1—2 of Fig. 8 was 12.7 centimeters in diameter and the side tube 21 was closed by a movable plunger 22. The input waves along the main guide then had a frequency of 1,780 megacycles and were polarized so that the electric vector was perpendicular to the plane of the axes of the two guides. In another particular experiment, it was found that little or no power was passed along the main guide when the distance from the axis thereof to the face of the plunger 22 was 16.9 centimeters. The wave length in the main guide then measured 27.8 centimeters. The minimum under these conditions was relatively dull, but when the distance from the main guide axis to the front face of the plunger 22 was increased to 30.5 centimeters there was another minimum, this minimum being very sharp.

When the electric vector was in the plane of the axes of the main and side tubes, there was a very sharp minimum through the main guide when the distance from its axis to the front face of the plunger was 21.8 centimeters. It is this minimum which should be selected in the design of such a system.

The cut-off for the main guide 1—2, with the diameter 12.7 centimeters as mentioned above, is readily computed to be at the frequency 1,382 megacycles. In any one of these cases therefore, the system operates as a band-pass filter between the critical frequencies of 1,382 megacycles and 1,780 megacycles. If it is desired to raise the lower limit it is only necessary to reduce the diameter of the main tube, thereby raising the cut-off frequency in accordance with the formula $$f = 17560/b$$

where $f$, the critical frequency, is measured in megacycles and the radius $b$ in centimeters. If it is desired to change the upper limit the new position of the plunger may be determined in accordance with the principles of standing waves. The velocity of transmission through the main guide may be calculated from the formula $$v = \frac{fc}{\sqrt{f^2 - f^2_c}}$$

where $c$ is the velocity of light in free space, $f$ is the frequency in megacycles, and $f_c$ is the critical frequency associated with the side tube in which the reflection effects take place. If the diameter of the main tube is made relatively large, then its cut-off frequency will be so far removed that the device as a whole may be regarded as a low-pass wave filter. To control the selective action of apparatus such as in Fig. 8, it may be desirable to use an iris diaphragm or its equivalent.

Fig. 22 shows a modification as compared with Fig. 8, with two opposed opposite plungers 22 and 22' in respective branches. In this connection it is ascertained by experiment that the condition for maximum attenuation in the main guide 1—2 depends on the state of polarization of the wave. If the main guide and the side tubes are 5 inches in diameter, and if the electric vector is in the plane of the side tubes, maximum attenuation occurs when each of these is 21.2 centimeters long. With the opposite polarization, the maximum attenuation occurs when each side tube is 25.5 centimeters long. A series of pairs of opposed side tubes like 21 and 21' of Fig. 22 may be spaced at equal intervals along the main guide 1—2 to give enhanced sharpness of selectivity as a band-pass wave filter.

The principle brought out in connection with Fig. 22 may be used to exclude certain frequencies from a band of frequencies as already described, or for the control of wave power passing along the main guide. In the latter case one or both of the plungers 22 and 22' may be provided with a very delicate adjustment, as by a rack and pinion, whereby the power passing along the main guide 1—2 may be varied from its maximum to almost zero. To a great extent this will be accomplished without energy loss so that the system will correspond to a pure reactance in electric circuit theory.

Referring to Fig. 23, this serves to illustrate the inherent high-pass effect in a dielectric guide without any reliance on reflection and reactance effects. Suppose electromagnetic waves are progressing from left to right in the dielectric medium within the cylindrical shell 62 and that they are of various frequencies down to the limiting frequency for the diameter of that guide. At the annular wall 63 where entrance is made to the guide 64 of reduced diameter, the lower frequencies will be stopped, and only the waves will get through in the guide 64 having higher frequencies above its limiting frequency. Thus, the system of Fig. 23 is a high-pass filter for transmission from left to right.

If the annular wall 63 is of appropriate resistance material such as carbon, as shown at 63' in Fig. 24, it may be made to absorb the energy of the lower frequency waves stopped at that point so that they will not be reflected back into the guide 62.

Fig. 25 shows a high-pass dielectric guide filter interposed in a coaxial conductor system. The coaxial conductors 65 and 66, in respective alignment with 65' and 66', are connected across by the enlarged section of dielectric guide having the metal sheath 67. Each of the outer coaxial conductors 65 and 65' is flared at 68 to connect with this cylinder. Each axial conductor 66 has a cone expansion 70 with base 71 forming one terminal electrode at the end of the dielectric guide section 67. An inwardly directed rim 69 opposite the electrode 71 forms the opposing electrode.

In the coaxial conductor system 65—66 the lines of electric force are radial. Conduction currents coming from the left are converted at 68—70 into dielectric displacement currents in the guide whose sheath is 67. At the other end, on the right, their energy is reconverted into conduction currents to go on in the coaxial conductors 65' and 66'. But the dielectric guide having the sheath 67 is adapted to transmit only those currents having frequencies above a certain limit. Hence, any current components in the coaxial conductor system having lower frequencies will not be transmitted and the device as a whole will act as a high-pass filter.

The structure of Fig. 26 is the same as that of Fig. 25, with the exception that the wall 67 is interrupted and its parts are extended in the two outwardly directed annular flanges 72 surrounded by the cylinder 73 of special material. This material may preferably be semi-conductive, as for example, graphite mixed with clay. The system stops waves of frequency below a certain limit, as already described for Fig. 25, but, in addition to this function, waves of frequency above a certain higher limit are diverted within the guide 67 to the annular enlargement 72—73, where they proceed as conduction waves rediating outwardly with lines of force extending across from one flange 72 to the other such flange. The energy of these highest frequency waves is absorbed by the shell 73. Hence, the waves that get through from left to right are those of frequency between the lower and upper limiting frequencies, whereby the device functions as a band-pass filter.

Another band-pass filter is shown in Fig. 27. This is like Fig. 26 except that the high frequency waves are absorbed in stub branch guides 74, each terminated by an energy absorbing element 75.

Fig. 28 shows a dielectric guide band-pass filter interposed in a line of two parallel conductors 76. The incoming conductors 76 are terminated at the diametrically opposite points 77 and 78 of one end of the cylindrical guide shell 67. Whereas the dielectric waves in Figs. 25, 26 and 27 are symmetric, in the case of Fig. 28 they will be asymmetric. The dielectric guide 67 of Fig. 28 has branch stub guides 74—75 like those of Fig. 27, with their axes in the plane determined by the two conductor terminals 77 and 78, but this is not a necessary condition. The system of Fig. 28 admits only those waves having frequencies above the limiting frequency for the guide 67, and within the guide 67 waves of yet higher frequency are absorbed in the stubs 74—75, so that the system as a whole operates as a band-pass filter.

In the examples of the invention disclosed heretofore, the dielectric guides have generally been assumed to be of circular cross-section. While this is convenient it should not be considered as essential; rectangular, elliptical or other cross-sections may be used. The principal essential for the reactive effects on which reliance has been placed, is to have a systematic series of discontinuities. The reactive elements may be regarded as made up of the cavities or spaces between the discontinuities. The cylindrical cavities that have been assumed may be changed to spherical, ellipsoidal or other shapes which may be regular or irregular without departing from the broad principles herein disclosed.

Figure 29:
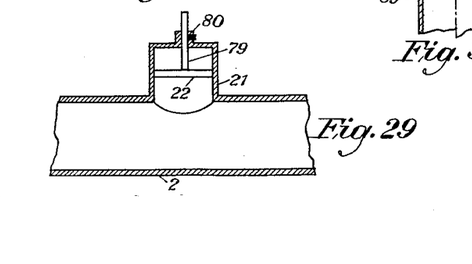
Fig. 29 is a section showing a dielectric guide with a stub branch having means for compensating the expansion due to temperature changes.

The wave guide elements that have been described depend for their reactive properties upon the dimensions of the spaces involved; these are determined by their conducting boundaries and are therefore modified by the contractions and expansions incidental to temperature changes. To obviate these, the conducting elements of the guide may be made of materials having low coefficients of thermal expansion, or the principle exemplified at Fig. 29 may be relied upon. The main guide having the metallic sheath 2 has a branch guide 21 like that of Fig. 8. To keep the chamber within shell 21 of constant length, notwithstanding the thermal expansion, the plunger 22 and the supporting stem 19 may be made of material having a higher coefficient of expansion than the material of the shell 21. Accordingly, by the proper choice of these coefficients and of the dimensions, after fixing an adjustment at 80 the length of the branch chamber 21—22 will remain unchanged notwithstanding a wide range of thermal changes.

Fig. 30 shows a wave meter. A chamber is formed having the cylindrical side wall 81 and the two end walls 82, with an adjustable opening 87 through which electromagnetic waves may be admitted to the interior. The effective length of the interior chamber is determined by adjustment of the plunger 83 by means of the screw 84. At the adjustment which gives the greatest resonance there will be a maximum reading on the meter 86 connected to the electrode 85 within the chamber. From the dimensions of the chamber the corresponding wave length and frequency may be computed. Or, if desired, there may be a calibrated scale associated with the screw 84. The meter 86 may comprise a high resistance crystal, in which case it should be located near a voltage maximum. If a low resistance thermocouple is employed it may advantageously be located near one end.

Figure 32:
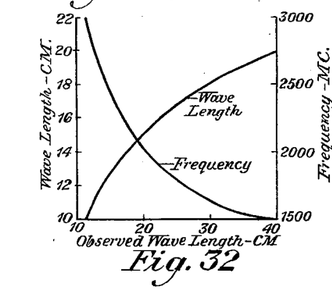
Fig. 32 is a diagram giving calibration curves for a particular design of wave meter according to Fig. 31.

A modified wave meter is shown in Fig. 31. Whereas the meter of Fig. 30 depends on operation at a single optimum adjustment based on a half wave length, the meter of Fig. 31 depends on two such adjustments. In Fig. 31 the opening 87 for admitting the waves, and the conductor 85', are located near the voltage maximum of one of the half waves. Measurements are made at the ends of both the first and second half wave lengths. A proper value of wave length is based on the difference of those measurements. This is probably more accurate than if a single measurement were made at the end of the first half wave length, inasmuch as the position of the first node may be modified by the presence of the coupling opening and the conductor. Sharpness of resonance depends to some extent on having little or no leakage around the piston. This effect may be secured by grinding the piston into the cylinder or providing it with an expanding ring similar to those used in internal combustion engines. In one demonstration of the wave meter of Fig. 31 the pipe 81 was made of seamless brass tubing 65 mills thick, 5½ inches in diameter and 16 inches long. With this meter, waves could be measured from 20 to 40 centimeters long in the pipe. This corresponds to waves in free space of from 15 to 20 centimeters, having respective frequencies of 2,000 to 1,500 megacycles. Waves outside this range could be measured, but with a slight sacrifice in accuracy. The calibration curve for this particular meter is given in Fig. 32.

Fig. 33 represents two guides 90 and 91 of different diameters between which it is desired to match their impedances. For example, the guide 90 may be of diameter 10.2 centimeters, and we may consider the transmission of asymmetric magnetic waves (H₁) at a frequency of 2,000 megacycles. It is desired to pass these waves into the guide 91 whose diameter is assumed to be 12.7 centimeters, and to accomplish this transfer without substantial reflection loss. With these dimensions and at the frequency stated, the characteristic impedance in the output guide 91 will be about twice that in the input guide 90.

The cylindrical chamber 88 is interposed with two adjustable ends 89. Also, the cylindrical chamber 88 is made in the form of two half cylinders meeting along the diametrically opposite longitudinal lines 92. In this way the chamber within the casing 88 can be adjusted to any desired length and the place along the length where the input is connected and the place along the length where the output is connected are independently adjustable. The diameter of the chamber 88 is 12.7 centimeters, the same as that of the output guide 91, and the end plungers 89 are adjusted so that its length is 21.5 centimeters. In this way it is secured that the length of the chamber is such as to give about one standing wave length. This is diagrammed in Fig. 34 where the solid curve represents the electric vector of the wave and the dotted curve represents the magnetic vector of the same wave. It will be understood that these vectors are at a right angle to each other and that for the asymmetric magnetic wave, which is assumed in this case, the magnetic vector has a component along the axis of the chamber 88 and the electric vector is at a right angle to this axis.

The standing waves set up in the chamber 88 provide the impedances against which the impedances of the two guides 90 and 91 will be matched. Referring to the diagram in Fig. 34, this shows that the electric component of the standing wave in the chamber 88 is zero at each end and also in the middle, and is a maximum midway between these points. The magnetic component is a maximum at the ends and also at the midpoint, and is zero at the two intermediate points.

Looking into the chamber 88 at various points along its length, it appears as a low impedance at points where the magnetic field is a maximum and as a high impedance where the electric field is a maximum. Accordingly, to match the impedances of the two wave guides 90 and 91 we connect each of them at the particular point along the chamber 88 where the impedances are appropriate.

If the waves being propagated are of the symmetric electric or asymmetric electric types, the characteristic impedance of the guides 90 and 91 will be low. In this case each guide should connect into the resonant chamber 88 near a voltage minimum as indicated by the solid curve in Fig. 34. The exact locations may be determined by experiment. If symmetric magnetic waves are being propagated, then the guides 90 and 91 may have a high characteristic impedance and should be connected into the resonant chamber 88, each near a voltage maximum. After making these adjustments to a first degree of approximation a further final adjustment for optimum conditions may be effected by again operating the two movable plungers 89.

I claim:

1. A band-pass filter consisting of a length of dielectric guide of suitable diameter to pass only waves above the lower critical frequency of the filter, and branch dielectric guide stubs of respective suitable different diameters to absorb waves of frequencies higher than the upper critical frequency whereby the filter as a whole passes only those waves of frequency between the two critical frequencies.

2. A filter for electromagnetic waves comprising a dielectric guide, and means at two places within the guide to reflect dielectrically guided waves therein, whereby the guide is selective with respect to frequency as determined by the relation of wave length to the spacing of those places.

3. The method of filtering components of alternating electric current waves according to frequency, which consists in reflecting the waves at different places and thereby producing a differential attenuation of those components according to the relation of their wave lengths and the spacing of said places.

4. A filter for electromagnetic waves comprising a dielectric guide, and partial discontinuities within the guide whereby components of different frequencies are differentially attenuated according to the relation of their wave lengths to the spacing of the discontinuities.

5. A filter for electromagnetic waves comprising a normal metal sheathed wave guide, like stub branches therefrom and like enlargements therein, said branches and enlargements being disposed in alternation and the respective lengths of said branches and enlargements being critically related to the critical frequencies of said filter.

6. A metal sheathed dielectric guide comprising a main portion of normal diameter, and a localized reactive device therein comprising an intermediate enlarged portion with annular end walls connecting it to the main portion, one such annular end wall being adjustable to vary the length of the enlarged portion.

7. A metal sheathed dielectric guide, and a coaxial annular chamber, said guide and chamber having a circumferential connection and said chamber being so proportioned as to be resonant at or about the frequency of electromagnetic waves in said guide.

8. A metal sheathed dielectric guide, and a coaxial annular chamber of limited length and a closed end wall, said guide and chamber having a circumferential connection whereby electromagnetic waves in the guide are transformed to concentric conductor waves in the chamber and vice versa.

9. A filter element for electromagnetic waves of high frequencies comprising a cylindrical chamber with an end wall, and an axial rod supported by the chamber wall and supporting the end wall, said chamber wall and said rod having compensating coefficients of temperature expansion to keep the axial length of the chamber constant with variation of temperature.

10. In combination with a metallic pipe comprising a guide for high frequency electromagnetic waves, a metallically bounded chamber connecting with the interior of said pipe, a piston forming one wall of said chamber, a rod for fixing the position of said piston, said rod and the walls of said chamber having compensating temperature coefficients of expansion to maintain the effective length of said chamber constant over a range of temperature.

11. In combination with a metal sheathed dielectric guide, an annular cylindrical wall coaxial therewith forming an annular resonant chamber, said guide and chamber having an annular opening connecting them, said chamber being of such length that it has a substantial reactive effect on electromagnetic waves in said guide.

12. In combination with a metal sheathed dielectric guide, an annular cylindrical wall coaxial therewith forming an annular resonant chamber, said guide and chamber having an annular opening connecting them, the radial width of said annular chamber being so related to the radius of said guide that dielectric waves in the guide will be transmitted along the said chamber as coaxial conductor waves and vice versa.

13. In combination with a metal sheathed dielectric guide, a comparatively short coaxial cylindrical shell within the guide, the radii of said guide and said shell being related for impedance match for dielectric waves in the guide and coaxial conductor waves in the annular space between said guide and said shell, said shell having an annular opening connecting its interior with the interior of said guide.

14. In combination with a metal sheathed dielectric guide, an annular cylindrical wall coaxial therewith forming an annular resonant chamber, said guide and chamber having an annular opening connecting them, the opening being at one end of said chamber, and said chamber being terminated away from said opening by a reflecting barrier, the length of said chamber between said opening and barrier being so related to the transverse dimensions of the guide that coaxial conductor waves in the chamber will resonate to dielectric waves in the guide.

15. A dielectric guide filter comprising a main guide and an associated resonant chamber with an opening connecting its interior with the interior of the guide, the size of said chamber being adjusted to a desired critical frequency of the filter.

16. A filter in accordance with claim 15 comprising an apertured metallic barrier disposed across said opening.

17. In a high frequency transmission system, an input wave guiding structure carrying electromagnetic waves of various frequencies, a localized frequency selective unit connected in tandem therewith for transmitting some of said waves and relatively attenuating others, said unit comprising a metallic pipe enclosing a dielectric medium, the character of the waves applied to said pipe being such that there is a critical frequency functionally related to the transverse internal dimensions of said pipe and the index of refraction of said dielectric medium separating a range of easy transmission and a lower frequency range of zero or lesser transmission, said dimensions and index of refraction being so related that said critical frequency lies between the waves to be transmitted and those to be attenuated, and another wave guiding structure connected in tandem with said pipe for receiving the waves transmitted thereby.

18. In a transmission system, a dielectric guide and means for propagating dielectrically guided waves therethrough, a filter connected in tandem with said guide for attenuating those of said waves that lie below a predetermined frequency, said filter comprising a short section of dielectric guide the transverse dimensions of which are such that the critical frequency thereof coincides with said predetermined frequency, and a wave guiding structure connected to said filter to receive the waves passed thereby.

19. A combination in accordance with the claim next preceding in which said section of dielectric guide comprises a metallic pipe.

20. A conductor system for the transmission of high frequency conduction currents and a localized frequency selective device interposed therein, said device comprising a short section of dielectric guide, a terminal structure operatively connected to said conductor system for converting conduction currents therein into electromagnetic waves of a kind such that they are readily transmitted through said guide only at frequencies above a cut-off frequency dependent on a transverse dimension of said guide and the index of refraction of the wave sustaining medium comprising said guide, said dimension and index of refraction being so correlated as to coincide with a critical frequency of said selective device, and another terminal structure for converting the waves transmitted through said device into the form of conduction currents in said conductor system.

21. In a filter for high frequency electromagnetic waves, input means comprising a metallic pipe, output means, a localized frequency discriminatory means consisting essentially of a metallic pipe interposed in tandem relation between said input and output means, and means for applying to said input means electromagnetic waves of various frequencies, one of the dimensions of said interposed metallic pipe being such that said filter discriminately affects the said waves of various frequencies applied to it.

22. In combination, an electromagnetic wave transmission path defined by and contained within a metallic surface, means for applying ultrahigh frequency waves of different frequencies to said path for transmission thereover and two partial electromagnetic discontinuities disposed in said path, there being only a dielectric medium within said surface between said two discontinuities, said discontinuities being so spaced apart that said waves of different frequencies are differently attenuated.

23. A combination in accordance with the claim next preceding in which said transmission path is defined by and contained within a metallic pipe and in which said discontinuities arise at the junction of pipe sections of different characteristic impedance.

24. In combination, a wave guide comprising a metallic pipe carrying in its interior electromagnetic waves occupying a wide range of frequencies, a section of said wave guide having a length comparable with the length of at least some of said waves and containing only a dielectric medium, said section of guide having a transverse dimension differing from the corresponding dimension of the connected portions of said wave guide whereby an impedance discontinuity is provided at each end of said section of guide, the length of said section being such that waves of different frequencies in said wide band are attenuated in greatly different degrees in their passage therethrough.

25. In combination, a wave guide comprising a metallic pipe, means for transmitting through said pipe electromagnetic waves of different frequencies and of a character such that they are readily transmitted through said pipe substantially only at frequencies above a critical frequency dependent on a transverse dimension of said pipe, and a localized reactance in said pipe comprising a short section of pipe of enlarged cross-section, one of the dimensions of said section of pipe being so related to the lengths of the waves transmitted therethrough that some of said waves are highly attenuated with respect to others.

26. In combination, a prismatic metallic chamber containing only a dielectric medium, input means for admitting to said chamber ultra-high frequency electromagnetic waves of different frequencies, output means for receiving electromagnetic waves from said chamber, the length of said chamber being comparable with the lengths of the waves admitted thereto and such that said waves of different frequencies are differently attenuated in their passage from said input means to said output means.

27. In a high frequency transmission system, a metallic pipe containing only a dielectric medium, means for transmitting through the interior of said pipe electromagnetic waves of different frequencies lying above a critical frequency dependent on a transverse dimension of said pipe, and a metallic pipe-like chamber branching from said pipe, said chamber being so proportioned that waves of said different frequencies are differently attenuated in their passage through said pipe.

28. A conductor pair for the transmission of high frequency conduction currents and a high-pass filter interposed therein comprising a section of dielectric guide and a pair of diametrically opposite electrodes at each end thereof connected with the respective conductors of said conductor pair, said electrodes being adapted to inter-convert conduction currents in said pair and displacement current waves within said section of guide, said displacement current waves being of a character such that they are transmitted with moderate attenuation through said section of guide only at frequencies above a critical frequency in part determined by a transverse dimension of said section of guide.

29. In a high frequency transmission system, an electromagnetic wave guiding structure comprising a metallic pipe and a metallic pipe-like chamber branching therefrom, the length of said chamber being comparable with the length of the waves within said pipe, whereby said chamber has a reactive effect on said waves.

30. A filter for high frequency electromagnetic waves comprising a section of wave guide that consists essentially of a metallic pipe, and a plurality of stub guides of like character branching therefrom, the lengths of said stub guides being adjusted to a desired critical frequency of the filter.

31. A guide for dielectrically guided waves consisting essentially of a metallic pipe and a filter interposed therein comprising a plurality of spaced pipe sections of enlarged diameter, the length, diameter and spacing of said pipe sections being so related as to establish the critical frequencies of said filter.

32. In a high frequency signaling system, a metal-sheathed wave guide for the transmission of dielectrically guided waves, a metallic-walled chamber having an opening connecting it with the interior of said guide, and a metallic diaphragm partially closing said opening so as to give said chamber a definite length comparable with the length of the waves within said guide.

33. In a dielectric guide system, a chamber, one boundary of which comprises an impedance irregularity, and means for passing dielectrically guided waves through said boundary, the frequency of said waves being that at which said chamber is resonant.

GEORGE C. SOUTHWORTH.